United States Patent [19]

Ally et al.

[11] Patent Number: 5,294,357
[45] Date of Patent: Mar. 15, 1994

[54] METHOD FOR PREPARING SALT SOLUTIONS HAVING DESIRED PROPERTIES

[75] Inventors: Moonis R. Ally, Oak Ridge, Tenn.; Jerry Braunstein, Clinton, Tenn.

[73] Assignee: Martin Marietta Energy Systems, Inc., Oak Ridge, Tenn.

[21] Appl. No.: 768,500

[22] Filed: Sep. 30, 1991

[51] Int. Cl.$^5$ ................................. C09K 5/00
[52] U.S. Cl. ........................ 252/67; 62/101; 252/69
[58] Field of Search ............... 252/70, 67, 69; 62/101

[56] References Cited

U.S. PATENT DOCUMENTS 3,831,390  9/1974  Hopkins ............................. 62/101
4,789,277  12/1988  Rhodes et al. ..................... 409/131

OTHER PUBLICATIONS

S. Petrucci (editor) Academic Press *Ionic Interactions*, pp. 195-198 (1971).
M. Abraham *Journal De Chimie Physique*, 78, pp. 57-59 (1981).
R. H. Stokes et al. *J. Am. Chem. Soc.* 70, pp. 1870-1878 (1948).
H. H. Emons, et al. *J. Electroanal. Chem.*, 180, 57-65 (1984).
J. F. Zemaitis, et al. *Handbook of Aqueous Electrolyte Thermodynamics*, DIPPR, 84-86 and 588-593 (1986).
K. S. Pitzer *Pure & Appl. Chem.* 61, 6, 979-988 (1989).

*Primary Examiner*—Christine Skane
*Assistant Examiner*—Necholus Ogden
*Attorney, Agent, or Firm*—Mark S. Graham; Joseph A. Marasco; Harold W. Adams

[57] ABSTRACT

The specification discloses a method for preparing salt solutions which exhibit desired thermodynamic properties. The method enables prediction of the value of the thermodynamic properties for single and multiple salt solutions over a wide range of conditions from activity data and constants which are independent of concentration and temperature. A particular application of the invention is in the control of salt solutions in a process to provide a salt solution which exhibits the desired properties.

13 Claims, 4 Drawing Sheets

METHOD FOR PREPARING SALT SOLUTIONS HAVING DESIRED PROPERTIES

The present invention relates to salt solutions and more particularly relates to a method of preparing salt solutions having desired thermodynamic properties.

Salt solutions are used in a great variety of industries for many purposes. Examples of the application of such solutions include ore leaching and extraction processes, wastewater treatment, chemical manufacturing, ion exchange and desalination processes, and commercial/industrial refrigeration and cooling cycles. Salts of lithium, potassium, sodium and various other metals have been used to provide such solutions.

In the design and operation of systems employing salt solutions, it is important to have a complete knowledge of the thermodynamic properties of the solutions over the range of expected operating conditions. For example, knowledge of the vapor pressure, specific heat and volume, enthalpy, crystallization, heat of vaporization and fusion, density and/or various other properties of the solution through a range of temperatures, concentrations and pressures is often critical to evaluation of the suitability of the solution for an intended use, and for properly controlling the process employing the solutions to insure that the desired behavior of the solution is maintained.

For the vast majority of known solutions, there is little or no data on these properties at the conditions likely to be employed in a given application. Attempts have been made to generate models from which the various properties can be predicted. However, the known models are of limited practical value because of their complexity and because they require experimental evaluation of too many parameters, particularly at the very high concentrations encountered in many real-world applications. The widely recognized technique of Pitzer, for example, as described in K. S. Pitzer and J. C. Peiper, "Thermodynamic Properties of Aqueous Sodium Chloride Solutions," *J. Phys. Chem. Ref. Data.* Vol 13, No. 1, 1984; K. S. Pitzer, "Fluids, both ionic and nonionic, over wide ranges of temperatue and composition," *Pure & Appl. Chem.*, Vol. 61, No. 6, pp. 9979–988, 1989, may contain as many as 23 parameters whose evaluation requires extensive experimental and computational effort, and is generally limited to dilute and moderately concentrated solutions. The Pitzer technique and others like it also suffer from the limitation that they are reliable, if at all, only for the specific solution and concentration of interest.

Accordingly, it is an object of the invention to provide a method for preparing salt solutions which exhibit desirable thermodynamic properties.

A further object of the invention is to provide a method of the character described which enables the preparation of salt solutions meeting the criteria required for specific applications with a minimum of experimental data and with relatively simple computations.

Another object of the invention is to provide a method of the character described which is useful for preparation of a wide variety of salt solutions containing single or multiple salt species.

Yet another object of the invention is to provide a method for preparing salt solutions for a wide variety of applications.

Still another object of the invention is to provide a method of controlling the properties of a salt solution in a fluid cycle to provide a salt solution possessing desirable properties for use in the cycle.

An additional object of the invention is to provide improved salt solutions for use as working fluids in heating and refrigeration cycles.

Having regard to the fulfillment of these and other objects, the present invention is generally directed to a method of providing a salt solution exhibiting a desired value of a selected thermodynamic property which comprises determining the water activity, a, in the solution at two different high salt concentrations at a reference temperature, $T_r$, wherein the water activity is related to the mole fraction of water, $x_w$, in the solution according to the general equation $$\frac{a/x_w}{(1-a)/(1-x_w)} = 1/cr + (c-1)a/cr.$$

The value of the left-hand side of the general equation is calculated at each value of a and $x_w$ and the values of the left-hand side of the general equation are plotted versus a to obtain a straight line. The value of the slope of the line is set equal to the $(c-1)/cr$ portion of the right-hand side of the general equation and the value of the intercept of the line is set equal to the $1/cr$ portion of the general equation to provide slope and intercept equalities expressed in terms of c and r. The values of c and r are then calculated from the slope and intercept equalities. A value for the quantity $\epsilon$ is calculated from the equation $c = \exp[\epsilon/RT_r]$. A test concentration $x_x$ and test temperature $T_x$ are selected and a value for $c_x$ is recomputed at $T_x$ from $c_x = \exp[\epsilon/RT_x]$. The value of a is then calculated at $T_x$ from the general equation at $r=r$, $c=c_x$ and $x=1-x_x$, and the value of the thermodynamic property is calculated from the value of a at $x_x$ and $T_x$ according to a thermodynamic expression relating the value of a and the value of the thermodynamic property at $x_x$ and $T_x$. The extent of any variation between the desired value of the thermodynamic property and the calculated value is determined and, to the extent of any variance between the calculated and desired values of the thermodynamic property in excess of an acceptable maximum variation, the value of at least one of the test values $x_x$ and $T_x$ is adjusted to reduce the variance between the calculated and desired values of the thermodynamic property to at or below the accepted maximum variance to cause the solution to exhibit the desired value of the property within the accepted variance.

In accordance with one aspect of the invention, the salt solution is used in a fluid stream in a process which includes means for changing the temperature and concentration of the salt solution. The step of selecting of the test temperature or test concentration comprises measuring the temperature of the solution or measuring the concentration of salt in the solution. The step of adjusting the value of the test temperature or the value of the test concentration comprises adjusting the temperature of the salt solution in the process or adjusting the concentration of salt in the solution. In this respect, the invention enables in situ provision of salt solutions which exhibit desired behavior in terms of various thermodynamic properties through modification of the conditions in the process which determine the values of the thermodynamic properties. To this end, arrays of values of the properties of interest may be calculated for a range of conditions of temperatures and concentrations for a given salt solution. These arrays are then stored in a computer memory. Then, temperature and/or density measurements for example are taken from the process by suitable means. The memory is then accessed to search for a corresponding temperature/concentration condition, yielding the stored value of the properties at the measured condition. Another portion of the memory contains an array of values of the thermodynamic properties in accordance with the desired behavior of the condition. If the value of the property or properties at the measured condition deviates from the desired value by more than an acceptable maximum variance, adjustment may be made in one or more of the conditions to provide a solution exhibiting the desired behavior.

Where the concentration of salt in the solution is a known and fixed value, as in a closed loop system, the invention enables control of the thermodynamic property merely by measurement of the temperature. In such a case, the text concentration $x_x$ is equal to the known concentration and the test temperature that is selected is the measured temperature. Of course, the process may be configured in some applications to enable alteration in the salt concentration, such as when adjustment in the temperature alone fails to achieve the desired value of the property.

The invention is applicable to provision of salt solutions which exhibit desired behavior in terms of a number of thermodynamic properties including vapor pressure, enthalpy, molal volume (density) and crystallization properties. These properties may be calculated from water activities of the solutions and both the activities and the thermodynamic properties may be determined as a function of temperature and concentration from constants which are unique to the salt solution and independent of temperature and concentration. Thus, salt solutions exhibiting desired values of the thermodynamic properties of interest may be provided as in a process setting merely from temperature measurements for solutions of known concentration.

The above and other features and advantages of the invention will now be further described in the following detailed description of various embodiments in conjunction with the drawings in which:

The invention is generally applicable to the preparation of salt solutions which exhibit desired behavior in terms of various thermodynamic properties, and is therefore subject to a number of embodiments. In accordance with one embodiment, the invention is used to provide a salt solution exhibiting desired vapor pressure characteristics for particular applications. For example, in a heat exchanger or refrigeration unit using a salt solution in a closed fluid cycle, the method enables the provision of solutions exhibiting desired vapor pressure characteristics necessitated by design constraints particular to the system involved.

Determination of the vapor pressures in accordance with the invention is based on knowledge of the water activities at the conditions of interest. For a solution containing a single salt in water, the water activity, a, of the solution is determined based on the following relationship:

$$\frac{a/x_w}{(1-a)/(1-x_w)} = 1/cr + (c-1)a/cr, \quad (1)$$

where $x_w$ = mole fraction of water in the solution,
$c = \exp[(\epsilon/RT)]$,
$\epsilon = -(E-E_1)$,
E = adsorption energy of water,
$E_1$ = liquefaction energy of water, and
r = number of moles of water sorption sites per mole of salt.

According to a preferred embodiment, the first step in the use of Eq. (1) for determining the activities is to obtain vapor pressures of the solution at a temperature within the range of expected temperatures, and for two different salt concentrations. Such vapor pressures may be obtained from published data or by experiment according to standard techniques.

From these two vapor pressures, the water activity may be calculated at each concentration from the relationship $a = P_{vs}/P_{vw}$ where $P_{vs}$ equals the vapor pressure above the solution and $P_{vw}$ equals the vapor pressure above pure water at the same temperature. This allows computation of the left-hand side of Eq. (1) for each concentration.

Since the parameters c and r in Eq. (1) are substantially constant at a given temperature, it follows that a plot of $(a/x_w)/[(1-a)/(1-x_w)]$ versus a will yield a straight line with a slope equal to (c-1)/cr and an intercept equal to 1/cr. From these intercept values, r and c are readily calculated.

The computed values of c and r enable computation of the water activity and, therefore, the vapor pressure above the solution, for other $x_w$ values of interest at the particular temperature.

Determination of c enables calculation of $\epsilon$ from $c = \exp[(\epsilon)/RT]$ which, along with r, is substantially independent of temperature and concentration. Thus, from $\epsilon$, one may calculate the value of c at other temperatures of interest. This enables computation of vapor pressures above the solution at such other temperatures through a range of concentrations in the same manner as previously described for the initial temperature at which c was calculated.

Figure 1:
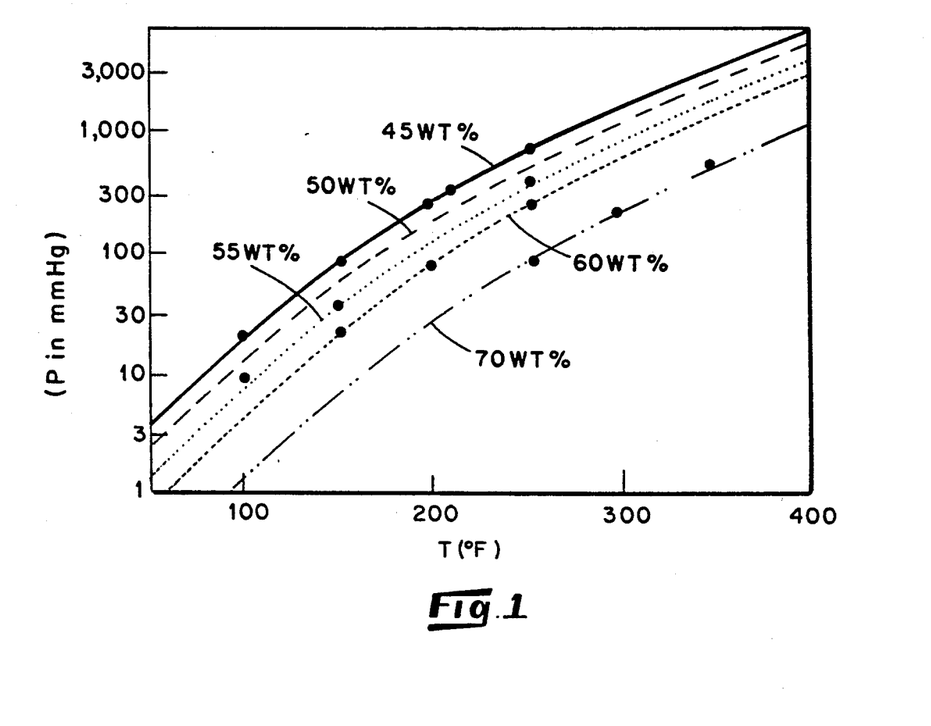
FIG. 1 is a graphical view illustrating vapor pressure data for LiBr solutions versus temperature to show the agreement between the data predicted in accordance with the invention and experimentally determined vapor pressures for solutions of the same compositions.
Figure 2:
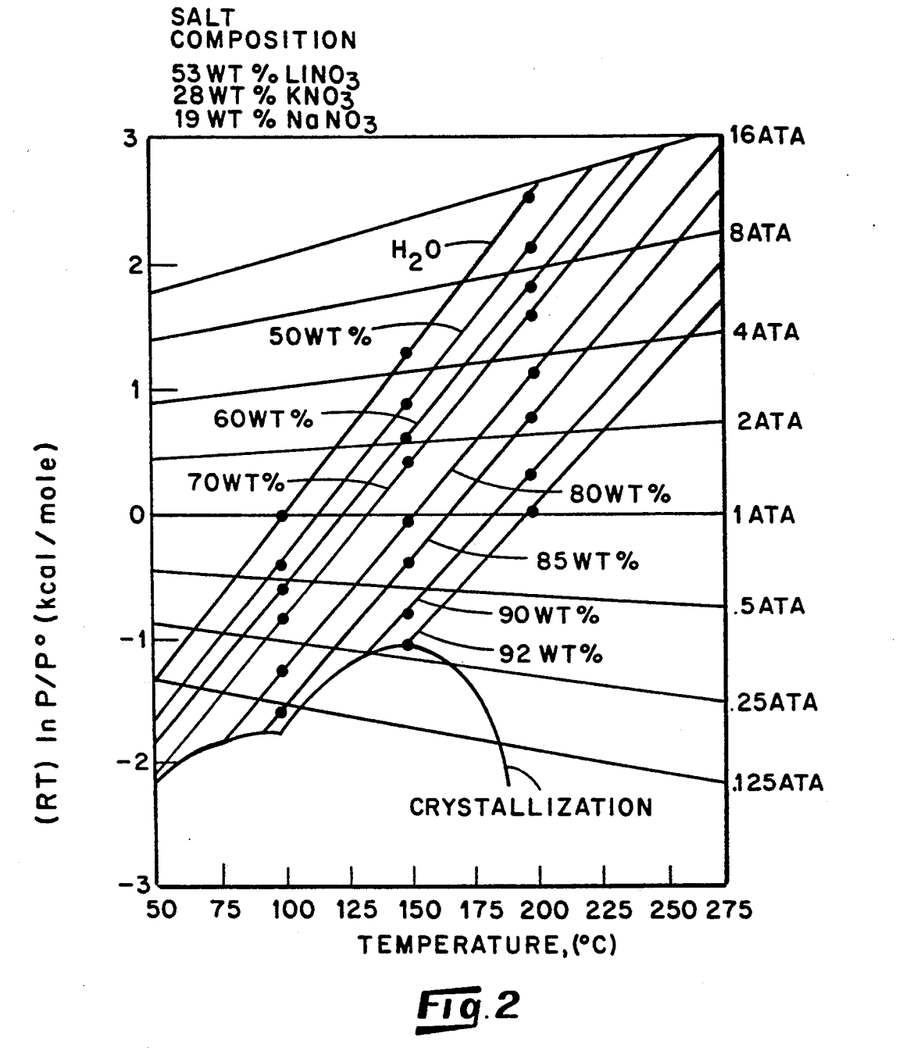
FIG. 2 is a graphical view illustrating vapor pressure data for (Li,K,Na) NO$_3$ solutions versus temperature and pressure to show the agreement between the data predicted in accordance with the invention and experimentally determined vapor pressures for solutions of the same compositions.

One use of Eq. (1) is illustrated in the chart of FIG. 1 which depicts a relationship of vapor pressure, temperature and concentration for solutions of LiBr. For this salt solution, the dimensionless value of r in Eq. (1) was determined to be 3.4 from the above procedure, and the value of $\epsilon$ was found to be 10.465 KJ/g-mole water. It is seen from FIG. 1 that the vapor pressures predicted according to the present invention track the experimentally determined values very closely.

For a solution containing a number of salts where vapor pressures are known for two high concentrations at a given temperature, the two parameters r and $\epsilon$ may be evaluated directly from the slope and intercept of the curve, $(a/x_w)/[(1-a)/(1-x_w)]$ versus a, in the same manner as is done for the case of the single salt above. Then, for each solution temperature and concentration chosen, the vapor pressures are obtained precisely as described for the single salt case.

If two vapor pressures for a solution containing several salts are unknown, then the parameters r and $\epsilon$ for the entire solution may be estimated from the sum of the r and $\epsilon$ values for each individual salt in a single salt solution. The r parameter of the mixture is calculated from the following equation:

$$r_m = \Sigma(r_i x_i), \quad (2)$$

where, i represents each salt component in the mixed salt,
$r_i$ = parameter r for salt component i, and
$x_i$ = mole fraction of salt component i in the mixed dry salt (not the same as the mole fraction of salt component i in solution, denoted elsewhere as $x_s$ or y).

The $\epsilon$ parameter for the solution is calculated from the following relationship:

$$\epsilon_m = [\Sigma x_i(r_i \epsilon_i)]/\Sigma(x_i r_i), \quad (3)$$

The value of c for each temperature is calculated from $\epsilon_m$ as follows:

$$c_m = c = \exp[\epsilon_m/RT]. \quad (4)$$

To obtain the vapor pressures above the solution at various temperatures and concentrations of interest, the calculations using Eq. (1) are repeated as in the single salt case.

Thus, to provide a multiple salt solution having desired vapor pressure characteristics, the mole ratios of the given salt ingredients in the mixed salt may be varied arbitrarily, and for each arbitrary variation, the parameters $r_m$ and $\epsilon_m$ reevaluated using Eqs. (2) and (3), respectively. With these values, the vapor pressure is calculated from Eq. (1). If the desired vapor pressure is achieved, then the composition of the mixed salts as given by the various mole fractions represents the tailor-made composition. If the desired vapor pressure is not achieved, then another composition of the salt mixture is chosen by varying one, two, or more amounts of the salt components, as deemed necessary, or the temperature and, thus, the value of $C_m$ varied. Also, if necessary, one or more ingredients comprising the salt mixture may be altered.

Similarly, to provide a single salt solution having desired vapor pressure characteristics, the values of $\epsilon$ and r are determined for the solution and Eq. (1) tested with the value of a corresponding to the desired vapor pressure at particular values of $X_w$ and T for equality as in the multiple salt case. If the equality is satisfied to within an acceptable degree, then the salt concentration for that solution is $1 - x_w$. If Eq. (1) is not satisfied, then it is retested at a different $x_w$ and/or different T (which requires calculation of a new c from $\epsilon$). The process of varying $x_w$ and/or T is repeated as necessary until the equality is satisfied or it is determined by appropriate limitations on the range of acceptable values of $X_w$ and T that the particular salt will not provide a solution exhibiting the desired vapor pressure.

It is thus seen that there is provided a relatively simple method for use in the preparation of single and multiple salt solutions which exhibit desired vapor pressure behavior under various conditions. The method enables preparation of solutions of having the desired properties from essentially two data points, and is thus a great advance in terms of its simplicity and minimal reliance on generation of experimental data.

A further embodiment of the invention relates to preparation of salt solutions which exhibit desired heat transfer properties as indicated by their enthalpies under conditions of interest. This application also involves use of a mathematical relationship between the water activity and the thermodynamic property of interest, in this case enthalpy. Thus, application of the general laws of thermodynamics to Eq. (1) yields the following relationship:

$$R[\partial \ln a/\partial(1/T)] = h_w^E = \frac{-c\epsilon[1 - rs - a]}{c(1 - rs) - 2a(c - 1) - 2}, \quad (5)$$

where, $$s = \frac{zM_w}{(100 - z)M_s}, \quad (5a)$$

$h_w^E$ = partial molal excess enthalpy of water in solution,
$M_w$ = molecular weight of water,
$M_s$ = molecular weight of pure of mixed salt, and
z = weight percent salt in solution.

The equation relating the salt activity, $a_s$, to r and c is given by:

$$\frac{\lambda(1 - x_s)}{x_s(1 - \lambda)} = r/c + r(c - 1)\lambda/c, \quad (6)$$

where, $\lambda = a_s^{(1/r)}$
$x_s$ = mole fraction of salt in the solution, and
$a_s$ = salt activity.

Equation (6) yields an expression for the partial molal excess enthalpy of the salt, $h_s^E$, as follows:

$$R[\partial \ln a_s/\partial(1/T)] = h_s^E = \frac{c\epsilon r[rs(\lambda - 1) + 1]}{[rs(c - 2) + 2rs(1 - c) - c]}. \quad (7)$$

The value of the molal integral enthalpy of the solution, H(y,t), relative to the enthalpy of some reference concentration, H(Y,t), is stated as follows:

$$H(y,t) = (y/Y)H(Y,t) + (1 - y/Y)[H_w(O,t) + h_w^E(Y,t)[ + \{(1 - y)[h_w^E(y,t) - h_w^E(Y,t)9 + y[h_s^E(y,t) - h_s^E(Y,t)]\}, \quad (8)$$

where,

Y = weight percent salt in solution taken to be the reference composition
y = weight percent salt in the solution $$H_w(O,t) = \int_T^t C_w^o dt, \text{ and} \quad (9)$$

$$H(Y,t) = \int_T^t C(Y,t)dt. \quad (10)$$

To obtain the integral enthalpy of the solution, H(y,t), relative to the reference enthalpy, H(Y,t), that is assigned an arbitrary value, at any arbitrary defined concentration, Y, calculations proceed from the reference concentration y=Y, and t=t. [Note: at y=Y and t=T, Eqs. 8 and 9 reduce to H(Y,T)=H(Y,T), which is the value of the reference enthalpy, assigned any arbitrary value.] For a solution containing a single salt in water, the r and $\epsilon$ values are first determined from the slope and intercept of Eq. (1), and used to obtain the water activity, a, by solving Eq. (1) at the reference temperature, T, and salt reference concentration, Y. If the solution contains several salts for which no data exists, Eqs. (2) and (3) are used to evaluate $r_m$ and $\epsilon_m$, or, if adequate data is available, the data is used to obtain r and $\epsilon$ values for the mixture before solving Eq. (1) to obtain the water activity, a. The value of s is obtained directly from the molecular weights and the weight fraction of salt in the solution. Once these values are obtained, they are used to calculate $h_w^E(Y,t)$ from Eq. (5) and $\lambda$ from Eq. (6). The value of $\lambda$ is then used in Eq. (7) to calculate $h_S^E(Y,t)$.

Thereafter, at any salt concentration of interest, y=y, and at the same temperature, t=t, Eq. (1) is solved to obtain the water activity corresponding to the concentration $x_w=(1-y)$.

Then, $h_w^E(y,t)$ is calculated from Eq. (5). A new value of s is then calculated from Eq. (5a). This value of s is used to obtain the value of $a_s$ from Eq. (6) which is used to calculate $\lambda$ again, and this value of $\lambda$ is used in Eq. (7) to calculate $h_s^E(y,t)$. At this point, either the steam tables or Eq. (9) may be used to obtain $\underline{H}_w(O,t)$. Eq. (10) is then used to obtain H(Y,t). For this, the specific heat of the solution at the reference concentration, Y, as a function of temperature should be known. Since this information may not always be available, the enthalpy at the reference concentration at only one other temperature t, high or low enough to be of interest which is distinct from the reference temperature, may be used to obtain a linear temperature fit for the enthalpy or C(Y,t). The purpose of linearly curve-fitting is to allow calculation of the enthalpy of the solution, H(Y,t), by interpolation between the reference temperature and the higher or lower temperature of interest.

The calculations are then repeated at other values of temperature t and $x_w$ that are of interest to obtain the entire enthalpy concentration diagram (or parts of it).

Use of the above-referenced procedure for preparing salt solutions of desired enthalpies was demonstrated for LiBr solutions and the results are shown in Table 1.

TABLE 1

Comparison of Correlated and Predicted Molar Enthalpies of Aqueous LiBr Solutions.

| Wt/% LiBr (dry) in sol'n | Correlated molar enthalpy kJ/kg-mole sol'n | Predicted molar enthalpy kJ/kg-molesol'n |
|---|---|---|
| T = 100° F. (311° K.) | | |
| 10 | 2.85 | 2.75 |
| 30 | 2.13 | 2.51 |
| 40 | 2.04 | 2.38 |
| 50 | 2.31 | 2.31 |
| 60 | 3.82 | 3.01 |
| 70 | 7.07 | 6.13 |
| T = 220° F. (378° K.) | | |
| 10 | 7.884 | 7.68 |
| 30 | 6.54 | 7.18 |
| 40 | 6.40 | 6.90 |
| 50 | 6.70 | 6.71 |
| 60 | 8.26 | 7.26 |
| 70 | 11.64 | 9.78 |
| T = 280° F. (411° K.) | | |
| 10 | 10.44 | 10.18 |
| 30 | 8.78 | 9.54 |
| 40 | 8.59 | 9.17 |
| 50 | 8.89 | 8.90 |
| 60 | 10.44 | 9.35 |
| 70 | 13.89 | 11.57 |
| T = 360° F. (456° K.) | | |
| 10 | 13.92 | 13.56 |
| 30 | 11.82 | 12.67 |
| 40 | 11.55 | 12.17 |
| 50 | 11.84 | 11.75 |
| 60 | 13.35 | 11.98 |
| 70 | 16.79 | 13.73 |

For these solutions, the values of r and $\epsilon$ were determined to be 3.4 and 10.465 KJ/g mole, respectively, from Eq. (1). The calculated values of the molar enthalpy, H(y,t), are determined as described and they are listed in the far right-hand column. The correlated values are those reported in American Society for heating Refrigeration and Airconditioning Engineers (ASHRAE) 1981 Fundamentals Handbook, p. 17-71.

The data of Table 1 show close agreement between the molar enthalpies determined according to the procedure disclosed herein and the molar enthalpies determined from measurements of the solution.

The method of enthalpy determination is further applicable in the preparation of salt solutions wherein a candidate single or multiple salt solution is tested for satisfaction of heat transfer criteria; e.g., ability to absorb or give up a desired amount of heat between two temperatures. One method of doing this is to provide two sets of values for the right-hand side of Eq. (8) for the candidate solution, each set corresponding to the temperature of interest, and then set the absolute value of the difference between these sets of values equal to the desired enthalpy difference. A trial concentration is then used to calculate the values as described above at each temperature, and the difference between the sets of values tested to determine if it meets the required enthalpy difference. If not, the process is repeated at other concentrations and/or mixtures of salts until the desired difference is obtained. The temperatures may also be varied along with the concentrations in an attempt to achieve the conditions necessary to give rise to the required enthalpy difference.

For the preparation of solutions exhibiting a desired density (or molal volume)-concentration-temperature relationships, Eq. (1) is modified by application of the general laws of thermodynamics to yield the following relationship:

$$RT[\partial \ln a/\partial p]_{T,x} = \qquad (11)$$

$$V_w - v_w = V_w^E = \frac{c[a + rs - 1]\epsilon'}{[c - 2 - crs - 2ac + 2a]},$$

where,
- $\bar{V}_w^E$ = partial molal excess volume of water in the solution, and
- $\epsilon' = [\partial \epsilon/\partial p]_{T,x}$.

Eq. (6) is modified to obtain the following expression for the partial molal excess volume of the salt, $\bar{V}_s^E$:

$$RT[\partial \ln a_s/\partial p]_{T,x} = \qquad (12)$$

$$V_s - v_s = V_s^E = \frac{[(r - R_w) - r\lambda]}{[cR_w - r(c - 2) + 2\lambda r(c - 1)]},$$

where,
$R_w = 1/s$.

It should be noted that aside from the two parameters r and $\epsilon$, there now appears an additional parameter, $\epsilon'$, which must be evaluated before the partial excess volumes of water and salt can be computed. The value of $\epsilon'$ for a particular salt-water solution may be extracted from experimental data on densities. However, one feature of the invention involves determination of $\epsilon'$ for preparation of a solution without the need for experimental data. This is accomplished with the following equation:

$$\epsilon' = \frac{V - [v_s x_s + v_w(1 - X_s)]}{\{x_s(1/\Omega_s - 1/\Omega) + 1/\Omega\}} \qquad (13)$$

where, $$1/\Omega_s = \frac{rc[r(\lambda - 1)] + R_w}{r[c - 2 - 2\lambda(c - 1)] - cR_w}, \qquad (14)$$

and $$1/\Omega = \frac{(a + rs - 1)c}{[c - 2 - crs - 2ac + 2a]}. \qquad (15)$$

The molal volume V at a given temperature and concentration is given by:

$$V(t,y) = (y/Y)V(t,Y) + (1 - y/Y)$$
$$[V_w(t,O) + V_w^E(t,Y)] + y V_s^E(t,y)$$
$$+ (1-y)[V_w^E(t,y) - V_w^E(t,Y)] \qquad (16)$$

The density of the solution is a stated as follows:

$$\rho(y,t) = 1/[V(t,y)(0.01y/M_s + (1-0.01y)/M_w)] \qquad (16a)$$

As described previously, r and $\epsilon$ may be calculated using Eq. (1) for single or mixed salt systems and s can be calculated from Eq. (5a). Next, Eqs. (14), (15) and (13) are used to evaluate $\epsilon'$. Typically, $\epsilon'$ is of the order of $10^{-4}$ m$^3$/kg-mole.

At the reference composition y=Y and temperature t, the water activity may be calculated from Eq. (1), enabling calculation of $V_w^E(t,Y)$ from Eq. (11). Eq. (6) is then solved to evaluate $\lambda$. This value of $\lambda$ is used in Eq. (12) to evaluate $\bar{V}_s^E(t,Y)$. Then, at any other salt concentration, y=y, and at the same temperature, the calculations are repeated to obtain $\bar{V}_w^E(t,y)$ and $\bar{V}_s^E(t,y)$. The term $V_w(t,O)$ is the molal volume of pure water, easily read from steam tables. V(t,Y) is the molar volume calculated from the reference density. Determination of the density at the temperature and concentration of interest then follows from solution of Eq. (16a).

The calculations described in the preceding paragraphs may be repeated at other values of temperature and concentration of interest to obtain the entire molal volume (density)-composition-temperature diagram (or parts of it).

To further demonstrate the use of the invention for preparing salt solutions of desired molal volume-temperature-concentration characteristics, a series of single salt and multiple salt solutions were prepared at various concentrations and the molal volumes were measured at various temperatures according to the procedure described in Tadashi Uemura, "Properites of Refrigerant-Absorbent Systems Used for Absorption—Type Refrigaration Machines," *Refrigeration* [*Reito*]. Vol. 52, No. 600, October 1975, Translation of paper for Oak Ridge National Lab., Report No. ORNL/TR-87/9 1987. Lithium Bromide was used for the single salt solution and mixtures of LiNO$_3$, KNO$_3$ and NaNO$_3$ were used for the multiple salt solutions.

The values of r and $\epsilon$ for the LiBr solution were determined to be 3.4 and 10.465 kJ/g mole from Eq. (1), and the value of $\epsilon'$ from Eqs. (13), (14) and (15) was determined to be 12.5 ×10$^{-4}$ kJ/g mole-Pa. The calculation of the densities then proceeded as described above.

For the LiNO$_3$/KNO$_3$/NaNO$_3$ solutions, $r_m$ and $\epsilon_m$ were calculated from Eqs. (1) and (2) as 1.992 and 3.553 kJ/g-mole, respectively. The value of $\epsilon_m'$ was determined to be 20.3×10$^{-4}$ kJ/kg-mole-Pa from Eq. (13), (14) and (15). From this information, the densities of the solutions were determined using the above-described procedure at y and t values corresponding to those of the solutions which were made up.

The results for the single salt solution are shown below in Table 2.

TABLE 2

| Comparison of correlated and predicted molar volumes of aqueous LiBr solutions | | |
|---|---|---|
| Mole Fraction LiBr (dry) in solution x | Correlated molar volume* m$^3$/kg-mole sol'n | Predicted molar volume, m$^3$/kg-mole sol'n |
| T = 30° C. | | |
| 0.01 | 0.01820 | 0.01817 |
| 0.05 | 0.01849 | 0.01849 |
| 0.10 | 0.01888 | 0.01889 |
| 0.15 | 0.01928 | 0.01930 |
| 0.20 | 0.01971 | 0.01973 |
| 0.24 | 0.02006 | 0.02011 |
| T = 50° C. | | |
| 0.01 | 0.01836 | 0.01831 |
| 0.05 | 0.01864 | 0.01863 |
| 0.10 | 0.01901 | 0.01903 |
| 0.15 | 0.01942 | 0.01943 |
| 0.20 | 0.01985 | 0.01987 |
| 0.24 | 0.02022 | 0.02029 |
| T = 100° C. | | |
| 0.01 | 0.01880 | 0.01887 |
| 0.05 | 0.01905 | 0.01913 |
| 0.10 | 0.01940 | 0.01946 |
| 0.15 | 0.01977 | 0.01981 |
| 0.20 | 0.02016 | 0.02019 |
| 0.24 | 0.02049 | 0.02056 |

The data of Table 2 show very close agreement between the predicted behavior of the solutions and the empirically determined molar volumes throughout the matrix of conditions. This demonstrates the facility of the invention for preparing solutions which exhibit desired molar volumes under conditions of interest and for determining, and thus controlling, the molal volume of the solution to maintain a desired value by monitoring only the temperature of the solution.

The data for the mixed salt system is shown below in Table 3.

TABLE 3

Comparison of correlated and predicted molar volumes of aqueous (Li, K, Na)NO$_3$ solutions.

| Mole fraction (Li, K, Na)NO$_3$ (dry) in solution x | Correlated molar volume m$^3$/kg-mole sol'n | Predicted molar volume m$^3$/kg-mole sol'n | Deviation % |
|---|---|---|---|
| T = 50° C. | | | |
| 0.01 | 0.01833 | 0.01840 | +0.38 |
| 0.05 | 0.01905 | 0.01907 | +0.10 |
| 0.10 | 0.01993 | 0.01993 | 0.00 |
| 0.15 | 0.02082 | 0.02080 | −0.10 |
| 0.20 | 0.02173 | 0.02170 | −0.14 |
| 0.25 | 0.02266 | 0.02263 | −0.13 |
| 0.30 | 0.02364 | 0.02359 | −0.20 |
| 0.35 | 0.02468 | 0.02459 | −0.36 |
| 0.40 | 0.02579 | 0.02562 | −0.70 |
| 0.45 | 0.02699 | 0.02667 | −1.19 |
| T = 100° C. | | | |
| 0.01 | 0.01906 | 0.01898 | −0.42 |
| 0.05 | 0.01979 | 0.01973 | −0.30 |
| 0.10 | 0.02071 | 0.02067 | −0.19 |
| 0.15 | 0.02165 | 0.02164 | −0.05 |
| 0.20 | 0.02259 | 0.02263 | +0.18 |
| 0.25 | 0.02355 | 0.02365 | +0.42 |
| 0.30 | 0.02452 | 0.02470 | +0.73 |
| 0.40 | 0.02651 | 0.02690 | +1.47 |
| 0.50 | 0.02859 | 0.03036 | +6.20 |

These data also show very close agreement between the predicted molar volumes and the experimentally determined molar volumes, even for a relatively complex multiple salt solution. This enables preparation of solutions exhibiting desired volumetric behavior under conditions of intended use as well as control of systems employing such solutions to maintain a desired volume in a convenient manner simply by monitoring the temperature of the solution.

As with vapor pressure and enthalpy properties, the invention is further applicable in the preparation of electrolyte solutions having a specific desired density at a given temperature. This may be accomplished by setting the left-hand side of Eq. (16) equal to the desired molal volume, and testing values of y and t in the calculation of the values on the right-hand side until the equality is satisfied. In addition to varying y, various compositions of salt mixtures may be tested to obtain the desired density.

With respect to crystallinity characteristics, the invention provides a method for determining the crystalline phases and hydrates which exist in equilibrium with an aqueous solution to enable preparation of salt solutions of known crystallization characteristics under various conditions. In accordance with a preferred embodiment, the first step in the method is to calculate the mole fraction of solute in the liquid hydrate of interest. For example in the case of sodium monohydrate, NaOH.H2O, the mole fraction of solute (NaOH), denoted by xsl, is 0.5; and the mole fraction of liquid water, denoted by xwl, is 0.5.

The water activity in the liquid hydrate is then calculated at the hydrate melting temperature from Eq. (1), which is rewritten as follows:

$$\frac{a_{wj}/x_{wj}}{(1-a_{wj})/(1-x_{wj})} = 1/cr + (c-1)a_{wj}/cr, \quad (17)$$

where, $c = \exp[(\epsilon)/RT]$.

As with the discussion concerning Eq. (1), a plot of the experimentally determined quantity, $(a_{wj}/x_{wj})/[(1-a_{wj})/(1-x_{wj})]$, versus a for two concentrations at a fixed T yields a straight line with slope $(c-1)/cr$ and intercept $1/cr$. The values of the slope and intercept then enable determination of c and r. Both are substantially independent of concentration for a given salt or salt mixture in solution (the value of r is also substantially independent of temperature). The value of c enables calculation of $\epsilon$ from $c=\exp[(\epsilon)/RT]$. Like r, the value of $\epsilon$ is substantially independent of temperature and concentration, and it enables calculation of o at other temperatures of interest.

The water activity in the solution is then calculated using Eq. (1) at the melting temperature of the jth hydrate.

The next step is to calculate the partial molal enthalpy of water in the jth hydrate melt from Eq. (5), rewritten as follows:

$$h_{wj}^e = \epsilon C \frac{[a_{wj} + rs - 1]}{[c(1-rs) - 2(a_{wj}(c-1) - 2]}, \quad (18)$$

where, $$s_j = x_{sj}/x_{wj}. \quad (18a)$$

The activity of the solute (salt) is then calculated in the jth hydrate melt using Eq. (6) in the following form:

$$\frac{\lambda_j(1-x_{sj})}{x_{sj}(1-\lambda_j)} = r/c + r(c-1)\lambda/c \quad (19)$$

where, $$\lambda_j = a_{sj}^{(1-r)}, \text{ and} \quad (19a)$$

$a_{sj}$ = salt activity corresponding to the jth hydrate.

After this, the partial molal excess enthalpy of the solute in the jth hydrate melt, $h_{sj}^e$, is calculated from Eq. (7), rewritten as follows:

$$h_{sj}^e = c\epsilon r \frac{rs(\lambda-1)+1}{rs(c-2)+2rs(1-c)\lambda - c}. \quad (20)$$

The equation giving the liquidus points is $$R\ln[a_s(T,x_w)a_w(T,x_w)] - R\ln[a_s(T_{mj},x_{wj})a_w(T_{mj},x_{wj})] = \quad (21)$$

$$\{L_{mj} - h_{sj}^e - jh_{wj}^e\}[T_{mj}^{-1} - T^{-1}].$$

The terms on the right hand side of Eq. (21) have been calculated in the preceding steps. The second term on the left hand side of Eq. (21) has also been calculated. The solution of Eq. (21) is completed by trial and error. At a particular value of T, chosen below the melting point of the jth hydrate, assume a trial value of $x_w$, calculate the water activity, $a_w$, at T and the trial value of $x_w$ using Eq. (18) [Note: $a_w = a_{wj}$, $x_w = x_{wj}$]. Then calculate the solute activity $a_s$ at T and $x_x$, $(1-x_w)$, as with Eq. (19a). [Note: $A_s = a_{sj}$; $x_s = x_{sj}$]. Use the computed values of $a_s(T, x_s)$ and $a(T, x_w)$ to compute the first term on the left hand side of Eq. (21). If the equality of Eq. (21) is satisfied, then the assumed values of $x_w$ (and hence $x_s$) are correct If not, then new values of $x_w$ are tested for satisfaction of Eq. (21). It is to be noted that at each temperature, T, there is a pair of $x_w$'s that will satisfy Eq. (21), and each $x_w$ may correspond to either a stable phase or a metastable phase.

Figure 3:
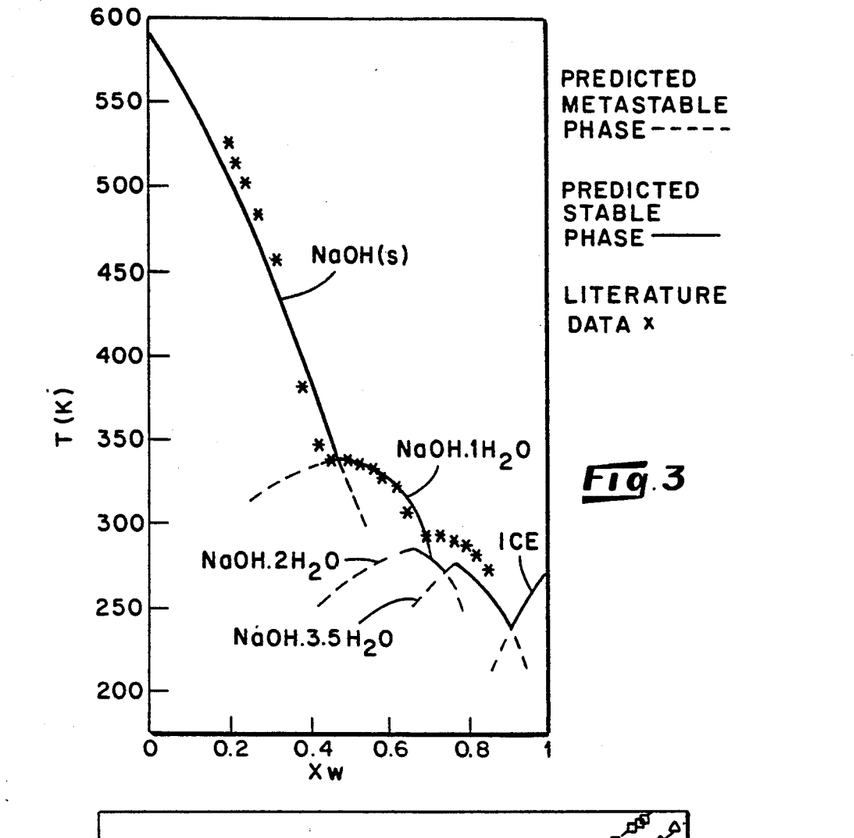
FIG. 3 is a graphical view illustrating data on crystalline phases of an aqueous NaOH solution for a range of temperatures and concentrations to show the agreement between the data predicted in accordance with the invention and experimentally determined crystallization data for solutions of the same concentrations.

The above procedure was used to provide crystallization data for an NaOH solution. The results are illustrated in FIG. 3, which shows very good agreement between the computed values of the various hydrates and the literature data.

To further illustrate the invention, there is disclosed a new and improved salt solution for use as a heat transfer fluid in absorption heat pumps. The solution was provided through use of the above-described procedures to satisfy certain vapor pressure and crystallization criteria. Specifically, it was determined that the solution should exhibit a vapor pressure of below about 15 mmHg at about 100° C. Significant process-affecting crystallization is to be avoided to temperatures down to about 80° C. The solution to be prepared was to be a mixture of bromide salts of lithium, cadmium and zinc.

From these calculations, it was determined that the solution should contain the components in the ranges shown below in Table 4 below.

TABLE 4

Ranges of LiBr, CaBr₂ and ZnBr₂ in Solution

| Component | Mole Fractions | Weight Fraction | Weight Ratio |
|---|---|---|---|
| LiBr (anhydr.) | 0.10–0.90 | 0.043–0.786 | 1.00 |
| CaBr₂ (anhydr.) | 0.05–0.70 | 0.101–0.801 | 2.304–18.628 |
| ZnBr₂ (anhydr.) | 0.05–0.90 | 0.113–0.904 | 2.593–21.0203 |

A preferred mixture falling within the ranges of Table 4 contains the quantities of components set forth below in Table 5.

TABLE 5

Preferred Mixture of LiBr, CaBr₂ and ZnBr₂ in Solution

| Component | Mole Fractions | Weight Fraction | Weight Ratio |
|---|---|---|---|
| LiBr (anhydr.) | 0.10 | 0.043 | 1.00 |
| CaBr₂ (anhydr.) | 0.30 | 0.294 | 6.84 |
| ZnBr₂ (anhydr.) | 0.60 | 0.663 | 15.42 |

Figure 4:
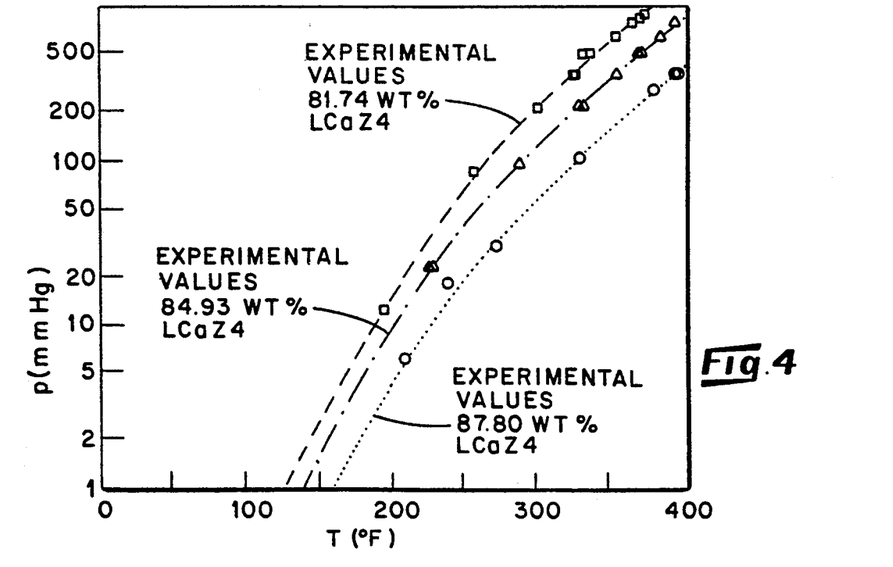
FIG. 4 is a graphical view illustrating vapor pressure data for a solution of LiBr, CaBr$_2$ and ZnBr$_2$ prepared in accordance with the invention versus temperature to show the predicted thermodynamic behavior of the solution in terms of vapor pressure.
Figure 5:
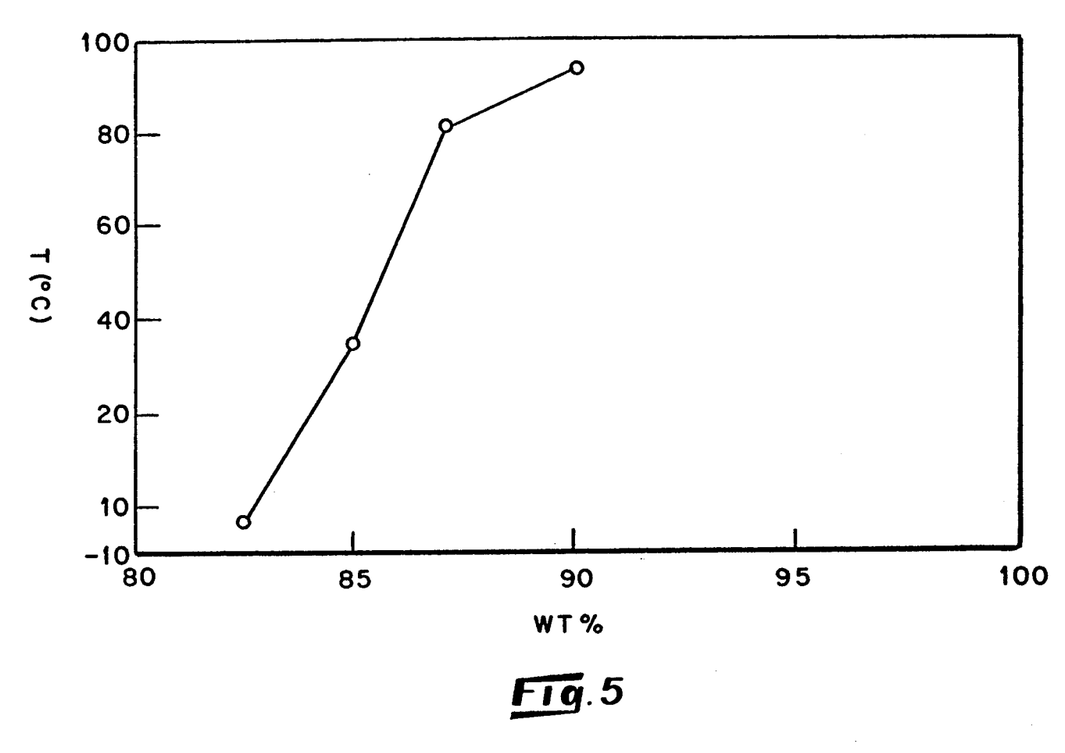
FIG. 5 is a graphical view illustrating crystallization data for the solution of FIG. 4 over a range of temperatures and concentrations.

In each case, the amount of water may be varied to fit the given application. The relatively low vapor pressure of the solution of Table 5 at various concentrations is verified by the experimental data of FIG. 4. The relatively low crystallization temperature is supported by the experimental data of FIG. 5.

The following exemplifies a step-wise procedure for preparing the salt mixture in Table 5 by titration of component stock solutions with AgNO₃ to insure accuracy in the resulting proportions of the components in the solution. It should be noted that if a standardized AgNO₃ solution is available, then its use is preferred. In that case, the initial AgNO₃ standardization steps may be omitted. The volume of the titrant may be different from those cited in steps 3 through 6, depending upon the particular standardized AgNO₃ solution chosen, but the calculations remain the same.

For the initial step, 2.3801 grams anhydrous KBr was weighed and diluted to volume in a 200 ml volumetric flask with deionized water. Since the formula weight of KBr is 119.0023 g/gmole, the resulting solution is 0.1 M.

Then, about 10 grams of AgNO₃ was dried in an oven at 50° C. for approximately 72 hours. After this, 8.5010 grams of the AgNO₃ was placed in a 1L volumetric flask and diluted to volume with deionized water. Since the formula weight for AgNO₃ is 169.8729, the resulting solution should be about 0.5 M.

Standardization was performed according to the technique known as the Volhard method. This involved transferring 10 ml of the previously prepared 0.1 M KBr solution to a 50 ml conical flask, along with approximately 0.1 g of Dextrin powder. The purpose of the Dextrin is to retard coagulation of the AgBr precipitate. Then 1 ml of Eosin indicator solution containing 1 mg Eosin/l in 95% aqueous ethanol was added. The AgNO₃ prepared earlier was titrated against the KBr solution until the indicator changed to a light pink color, indicating the endpoint. The volume of AgNO₃ averaged over three titrations was 9.75 ml, from which the molarity of the standardized solution was calculated to be 0.1026 M.

For preparation of a LiBr stock solution, 1977.57 grams of LiBr (FW 86.86) was dissolved in 1523.90 grams of deionized water, followed by filtration. A precise measurement of the anhydrous salt (LiBr) content was made by titrating it against the standardized AgNO₃ solution For this 8.0058 grams of the filtered stock solution were diluted to 1 liter with deionized water. Ten ml of this diluted LiBr solution was added to a 50 ml conical flask, along with 1 ml of Eosin solution, 0.1 g Dextrin, and 0.1 g NaHCO₃ for pH adjustment. The resulting solution was titrated against the 0.1026 M standard AgNO₃. The volume of AgNO₃ that was used until the end-point was 4.99 ml. The precise LiBr salt content of the stock solution was calculated as follows:

$$\text{Wt. \% LiBr (anhydrous)} = \frac{0.1026 \times FW \text{ of LiBr} \times 100 \times 4.99}{10 \times 8.0058} \quad (22)$$
$$= 55.51 \text{ wt. \%}$$

For preparation of a CaBr₂ stock solution, 1019.18 g of CaBr₂ (FW 199.91) was dissolved in 679.58 grams of deionized water, followed by filtration. A precise determination of the anhydrous salt (CaBr₂) content was made by titrating the filtered solution against the standardized AgNO₃ solution. For the titration, 7.9780 grams of the filtered solution wad diluted to 1 liter with deionized water. Ten ml of this diluted CaBr₂ solution was placed in a 50 ml conical flask, along with 1 ml of Eosin solution, 0.1 g Dextrin, and 0.1 g NaHCO₃ for pH adjustment. The resulting solution was titrated against the 0.1026 M standard AgNO₃ solution. The volume of AgNO₃ that was used until the end-point was 4.00 ml. The precise CaBr₂ salt content of the stock solution was calculated as follows:

$$\text{Wt. \% CaBr}_2 \text{ (anhydrous)} = \frac{0.1026 \times FW \text{ of CaBr}_2 \times 100 \times 4.00}{2 \times 10 \times 7.9780} \quad (23)$$

$$= 51.44 \text{ wt. \%}$$

For preparation of a ZnBr$_2$ stock solution, 1977.36 grams of ZnBr$_2$ (Fw 225.21) was dissolved in 1318.58 grams of deionized water, followed by filtration. A precise determination of the anhydrous salt (ZnBr$_2$) content was made by titrating the filtered solution against the standardized AgNO$_3$ solution. For the titration, 8.0560 grams of the filtered ZnBr$_2$ solution was diluted to 1 liter with deionized water. Then, 10 ml of this diluted solution was placed in a 50 ml conical flask, along with 1 ml of Eosin solution, 0.1 g Dextrin, and 0.1 g NaHCO$_3$ for pH adjustment. The solution was then titrated against the 0.1026 M standard AgNO$_3$. The volume of AgNO$_3$ used until the end-point was 4.20 ml. The precise ZnBr$_2$ (anhydrous) salt content of the stock solution was calculated as follows:

$$\text{Wt. \% ZnBr}_2 \text{ (anhydrous)} = \frac{0.1026 \times Fw \text{ of ZnBr}_2 \times 100 \times 4.20}{2 \times 10 \times 8.0560} \quad (24)$$

$$= 60.26 \text{ wt. \%}$$

To prepare the solution containing the three anhydrous salts mixed together in the ratios specified in Table 2, the stock solutions were mixed together in a suitable vessel in the following proportions: 7.21 grams of the LiBr stock solution, 53.17 grams of the CaBr$_2$ stock solution and 95.10 grams of the ZnBr$_2$ stock solution. The resulting solution contained 4.00 grams anhydrous LiBr, 27.35 grams anhydrous CaBr$_2$, 61.67 grams anhydrous ZnBr$_2$ and 62.55 grams deionized water. Hence, the wt. % salt in the solution was 59.79. For preparation of more concentrated solutions, one may simply evaporate or boil off some of the water by heating the solution and the precise concentration of the concentrated solution measured by Volhard titration. To prepare a more dilute solution, one may simply add deionized water, and then perform the Volhard titration to determine the precise wt. % of salt in the solution.

As mentioned above, the method of the present invention includes among its applications the control of processes employing salt solutions such as heat pumps and other systems and processes containing a fluid stream consisting of a salt solution or operating on a fluid cycle employing a salt solution as the working or heat transfer fluid. For example, for a salt solution of known concentration, the temperature of the solution at a stage in a process may be used as the single data input to determine the vapor pressure, the density, the enthalpy and/or the state of the solution vis-a-vis formation of crystals of a given hydrate. This enables the provision of a salt solution exhibiting desired thermodynamic properties by monitoring the solution in use and modification of conditions as necessary to cause the properties to remain within desired levels. Thus, the temperature of a salt solution of a known concentration may be measured and used to enable the calculation of the instantaneous or time-averaged values of the thermodynamic property of interest.

To the extent of any variance between the calculated values and the desired values in excess of a predetermined acceptable maximum variation, the temperature and/or concentration may be adjusted to bring the solution to within the acceptable minimum variance. Such temperature adjustments may be accomplished in a number of ways. For example, in a closed system the temperature at the point of measurement may be altered by changing the flow rate of the solution, or of a cooled or heated stream to or from which heat is being transferred. Auxiliary heat exchangers may also be used to provide variability in the solution temperature. The pressure may also be adjusted to vary the temperature.

Variations in the salt concentration may be accomplished by direct additions of salt or water, or by bleeding off a portion solution and replacing it with solution containing a different salt concentration. A change in the concentration itself may cause a change in the temperature owing to differences in the solution enthalpies which are a function of concentration.

It is noted from the foregoing that control of the thermodynamic properties of a salt solution stream in a process through temperature changes requires recalculation of the c parameter for use in Eq. (1) from the value of $\epsilon$, since c is a function of temperature. However, the values of r and $\epsilon$ are substantially independent of temperature over a relatively wide range. And since c can be determined from $\epsilon$, new values of the activity and, thus, the thermodynamic properties of interest, may be calculated directly from temperature measurements. The values of r, c and $\epsilon$ are all also substantially independent of solution concentration for a given salt or salt mixture at any fixed temperature. Accordingly, the value of the activity and, therefore the value of the property of interest is readily determined at the altered concentration from the same values of r, c or r and $\epsilon$ as used at the previous concentration, assuming the temperature remains substantially unchanged.

Thus, the invention will be seen to enable the preparation or making of salt solutions which exhibit desired behavior in terms of various thermodynamic properties, in the sense that control may be established over a solution stream to modify the conditions (temperature or concentration) which determine the values of the thermodynamic properties to provide a salt solution which exhibits the desired behavior.

In one embodiment, arrays of values of the properties of interest may be calculated for a range of combinations of temperatures and concentrations. These arrays are stored in a computer memory. Then, temperature and/or concentration measurements are taken from the process by any suitable means. The memory is searched for a corresponding temperature/concentration condition, yielding the stored value of the property or properties at the measured condition. Another portion of the memory contains an array of values of the properties according to the desired behavior of the solution. If the value of the property or properties at the measured condition deviates from the desired value by more than an acceptable maximum variance, adjustments may be made in one or more of the conditions to provide a solution exhibiting the desired behavior.

The computer may be configured to evaluate whether the initial change in the value of a property causes the value to move closer or farther from the desired value. If the value moves closer, then the amount of the change is determined and the magnitude of the next change in the condition is determined in accordance with a magnitude expected to bring the value to the desired level based on the amount of the previous move. The process is repeated until the desired level is reached. If the initial change in the condition causes the value to move farther away from the desired value, then the direction of the change (increase or decrease) in the condition is reversed and the magnitude decreased, and the value of the property recomputed.

In addition, the computer may be programmed to "learn" from past adjustment in properties necessary to achieve the desired level of the thermodynamic properties of interest. Thus, the magnitude and direction of changes in conditions necessary to bring the solution into compliance with respect to the desired values of the properties from a given state of non-compliance may be stored in memory. These arrays of learned adjustments are accessed each time a state of noncompliance is reached and the information used as appropriate to determine the changes to be made in the conditions necessary to maintain the desired behavior of the solution.

It will be further recognized that the invention enables the provision of salt solutions exhibiting desired behavior in terms of the values of certain thermodynamic properties and by nonintrusive measurement techniques or sample withdrawal procedures. In particular, the measurement of temperature may be made using thermocouples. The measurement of concentration may be accomplished nonintrusively by measurement of density and temperature as described by M. Ally, et al, in "Densities and Refractive Indexes of Aqueous (Li,K,Na) $NO_3$ Mixtures", 36 *J. Chem Eng. Data*, pp. 209-213 (1991), the disclosure of which is incorporated herein by reference.

Although various embodiments and features of the present invention have been described in the foregoing detailed description, it will be understood that the invention is capable of numerous rearrangements, modifications and substitutions without departing from the scope and spirit of the appended claims.

What is claimed:

1. A method of making a salt solution exhibiting a desired value of a selected thermodynamic property which comprises determining the water activity, a, in the solution at two different concentrations of the salt in solution at a reference temperature, $T_r$, wherein the water activity is related to the mole fraction of water, $x_w$, in the solution according to the general equation $$\frac{a/x_w}{(1-a)/(1-x_w)} = 1/cr + (c-1)a/cr,$$

calculating the value of the left-hand side of the general equation at each value of a and $x_w$, plotting the values of the left-hand side of the general equation versus a to obtain a line, setting the value of the slope of the line equal to the $(c-1)/cr$ portion of the right-hand side of the general equation and setting the value of the intercept of the line equal to the $1/cr$ portion of the general equation to provide slope and intercept equalities expressed in terms of c and r, calculating c and r from the slope and intercept equalities, calculating $\epsilon$ from the equation $c=\exp[\epsilon/TR_r]$, selecting a test condition of concentration $x_x$ and test temperature $T_x$, calculating the value of $c_x$ at $T_x$ from $c_x=\exp[\epsilon/RT_x]$, calculating a at $T_x$ and $x_x$ from the general equation at $r=r$, $c=c_x$ and $x_w=1-x_x$, calculating the value of the thermodynamic property from the value of a at $x_x$ and $T_x$ according to a thermodynamic expression relating the value of a and the value of thermodynamic property at $x_x$ and $T_x$, determining the extent of any variation between the desired value of the thermodynamic property and the calculated value and, to the extent of any variance between the calculated and desired values of the thermodynamic property in excess of the an acceptable maximum variation, adjusting the value of at least one of the test conditions to reduce the variance between the calculated and desired values of the thermodynamic property to at or below the accepted maximum variance to cause the solution to exhibit the desired value of the property within the accepted variance, and incorporating in water an amount of the salt which in its resulting concentration in the solution causes the thermodynamic property to be within the accepted variance based on the adjusted value of $X_x$ or $T_x$ which causes the solution to exhibit the desired property.

2. The method of claim 1, wherein the salt solution comprises a plurality of salts and the values of r, c and $\epsilon$ for the solution are obtained by obtaining the values of $r_i$, $c_i$ and $\epsilon_i$ for each salt in an aqueous solution and calculation of r from $r=\Sigma(r_ix_i)$, $\epsilon=[\Sigma x_i(r_i\epsilon_i)]/\Sigma(x_ir_i)$ and $c=\exp[\epsilon/RT]$, and the values of r, c and $\epsilon$ are used to calculate the water activity at the test concentration $x_x$ and $T_x$.

3. The method of claim 1, wherein the test concentration $x_x$ and test temperature $T_x$ are selected by measuring the temperature of the solution and measuring the concentration of salt in the solution.

4. The method of claim 1, wherein the concentration of the solution is known and the test concentration $x_x$ is equal to the known concentration, and the selection of the temperature $T_x$ comprises measuring the temperature of the solution.

5. The method of claim 1, wherein the adjustment in the value of at least one of the test conditions comprises adjusting the temperature and/or concentration of the solution.

6. The method of claim 1, wherein the adjusting of the value of at least one of the test conditions further comprises recalculating the value of the water activity and the value of the thermodynamic property at the adjusted test condition(s) to cause the value of the thermodynamic property to be at or below the acceptable maximum variance, and adjusting the temperature and/or concentration of the solution in accordance with the adjusted values of the test conditions.

7. The method of claim 1, wherein the salt solution is being used in a fluid stream in a process including means for measuring and means for changing the temperature and/or concentration of the salt solution in the fluid stream, the selecting of the test conditions of temperature $T_x$ and/or concentration $x_x$ comprising measuring the temperature of the solution and/or measuring the concentration of salt in the solution, and the adjusting of the value of $T_x$ and/or $x_x$ comprises adjusting the temperature and/or concentration of the salt solution.

8. The method of claim 7 wherein the values of r and $\epsilon$ are stored in a computer memory, and these values are accessed and used in the computation of the value of the thermodynamic property at the test condition and the value of the property for any adjustments in the test condition.

9. The method of claim 8, wherein the value of the thermodynamic property is calculated for an array of test conditions to provide an array of values of the property corresponding to the array of test conditions, and the calculating of the value of the property at the measured value of the test condition and determining of the extent of variation between the calculated and desired values of the property comprises selecting a test condition in the array of test conditions corresponding to the measured values and comparing the value of the property at the selected test condition to the desired value.

10. The method of claim 1, wherein the thermodynamic property is vapor pressure and is calculated from the value of the activity at $x_x$ and $T_x$ by multiplying the activity times the vapor pressure of pure water at $T_x$.

11. The method of claim 1, wherein the thermodynamic property is selected from the group consisting of vapor pressure, enthalpy, molal volume and the state of the solution with respect to the formation of crystals.

12. In a process employing a salt solution of known concentration $x_s$ flowing in a fluid stream, an improved method of controlling a thermodynamic property of the salt solution to maintain the value of the property at a desired level comprising determining the water activity, a, in the solution at two different salt concentrations at a reference temperature, $T_r$, wherein the water activity is related to the mole fraction of water, $x_w$, in the solution according to the general equation $$\frac{a/x_w}{(1-a)/(1-x_w)} = 1/cr + (c-1)a/cr,$$

calculating the value of the left-hand side of the general equation at each value of a and $x_w$, plotting the values of the left-hand side of the general equation versus a to obtain a line, setting the value of the slope of the line equal to the $(c-1)/cr$ portion of the right-hand side of the general equation and setting the value of the intercept of the line equal to the $1/cr$ portion of the general equation to provide slope and intercept equalities expressed in terms of c and r, calculating c and r from the slope and intercept equalities, calculating $\epsilon$ from the equation $c=\exp[\epsilon/RT_r]$, temperature $T_s$ of the solution, calculating the value of $c_s$ at $T_s$ from $c_s=\exp[\epsilon/R_sT]$, calculating a at $T_s$ and $x_s$ from the general equation at $r=r$, $c=c_s$ and $x_w=1-x_s$, calculating the value of the thermodynamic property from the value of a at $x_s$ and $T_s$ according to a thermodynamic expression relating the value of a and the value of the thermodynamic property at $x_s$ and $T_s$, determining the extent of any variation between the desired value of the thermodynamic property and the calculated value and, to the extent of any variance between the calculated and desired values of the thermodynamic property in excess of an acceptable maximum variation, adjusting at least one of the values of the temperature $T_s$ and/or concentration $x_s$ to reduce the variance between the calculated and desired values of the thermodynamic property to at or below the accepted maximum variance to cause the solution to exhibit the desired value of the property within the accepted variance and incorporating in the fluid stream an amount of the salt solution and adjusting the concentration of the salt solution to cause the thermodynamic property to be within the accepted variance based on the adjusted value of Xx or Tx which causes the solution to exhibit the desired property.

13. The method of claim 12, wherein the salt solution comprises LiBr in a mole fraction range of from about 0.1 to 0.9, $CaBr_2$ in a mole fraction range of from about 0.05 to about 0.76 and $ZnBr_2$ in a mole fraction range of from about 0.05 to about 0.9.

* * * * *